United States Patent [19]

Seckel

[11] Patent Number: 4,923,223
[45] Date of Patent: May 8, 1990

[54] KINK IMPEDING HOSE FOR SPRAYING WATER

[75] Inventor: Peter H. Seckel, Montclair, N.J.

[73] Assignee: Plastic Specialties and Technologies Investments, Inc., Ridgefield, N.J.

[21] Appl. No.: 386,197

[22] Filed: Aug. 1, 1989

Related U.S. Application Data

[63] Continuation-in-part of Ser. No. 228,993, Aug. 5, 1988, Pat. No. 4,867,485.

[51] Int. Cl.$^5$ ............................................. F16L 11/04
[52] U.S. Cl. .................................... 285/175; 285/176; 285/258; 285/259; 138/109; 138/119
[58] Field of Search ............... 285/258, 259, 176, 256, 285/175, 174; 138/109, 119

[56] References Cited

U.S. PATENT DOCUMENTS 3,017,203  1/1962  MacLeod ........................ 285/259 X
4,800,916  1/1989  Lakey ............................. 285/256 X Primary Examiner—Randolph A. Reese
Assistant Examiner—Carol I. Bordas
Attorney, Agent, or Firm—Wood, Herron & Evans

[57] ABSTRACT

A kink resistant flexible plastic or rubber hose for spraying water is provided having a plurality of functions including resistance to hose kinking, water delivery through the hose when kinked and equalization of water pressure on both sides of the kink causing the hose to snap open. The hose is adapted for coupling to a pressurized water supply for delivery of water through the hose and a spraying device is coupled to the other end to provide sufficient back pressure for equalization and opening of the kinked hose during delivery of a pressurized stream of water. The hose is especially suited for use as a garden hose and for other water delivery purposes in boat, camper, car, patio, potable and other environments.

20 Claims, 3 Drawing Sheets

KINK IMPEDING HOSE FOR SPRAYING WATER

RELATED APPLICATION

This application is a continuation-in-part of application Ser. No. 228,993, filed August 5, 1988, now U.S. Pat. No. 4,867,489, entitled "Kink Impeding Hose and Coupling", issued to Peter H. Seckel.

BACKGROUND OF THE INVENTION

I. Field of the Invention

This invention is directed toward the field of hoses, more particularly hoses with coupling connectors at each end for spraying pressurized water, and most particularly, to a novel garden hose having longitudinally extending internal ribs.

II. Discussion of the Prior Art

Flexible hose has been manufactured for many years, first out of natural rubber and more recently out of petrochemical derivatives such as synthetic rubber, thermoplastic rubbers or plastics. It has been known all along that kink resistance is related to diameter, wall thickness and the material's flexibility. Kink resistance is inversely proportional to diameter. The smaller the diameter the greater the flexibility, so the hose will readily bend, and not kink. It is directly related to wall thickness, a heavier wall will resist kinking. Most importantly, it is directly related to the flexibility (elongation) of the material. More flexible materials will bend rather than kink. Burst strength is also directly related to diameter, wall thickness, flexibility, or, in this case, more correctly the tensile strength of the hose construction.

"Kinking" occurs when the hose is doubled over or twisted. With reference to a kinked hose 2 shown by FIGS. 2 and 13, that side which forms the inside surface 104 of the kink resists compression while that side forming the exterior surface 102 of the kink resists elongation. As a result, the walls of the hose more readily fold upon themselves. A consequence of kinking is that the fluid flow through the hose can be either severely restricted or stopped. Kinking is a nuisance, causing the user to waste time unkinking the hose.

Hoses, such as garden hoses or other water delivery hoses, were initially made with thick walls to resist pressure. However, this made the hose more cumbersome. Subsequently, fiber reinforcements became available. Rubber hoses were wrapped with woven tapes, another outer coating layer was added, and the whole assembly was vulcanized. The fiber reinforcement allowed the total wall thickness to be reduced. Plastic hoses, derived from petrochemicals, are typically extruded using soft vinyl thermoplastic. Extrusion manufacturing of hose is a continuous process. Soft vinyl thermoplastic is defined in the art by the degree of its hardness measured with a durometer. Typical durometer measurements for soft vinyl plastic range from 60 to 90 as measured by ASTM method D-2240. By the time plastic hose came along the use of tapes had been replaced by "knitting" tire cord around the inner core of the hose, followed by the addition of an outer coating. This greatly added to burst strength and, due to the knitting of the fiber, the hose had some flexibility. A more modern and faster production approach is "wrapped" fiber which is spirally wound around the inner core. Knitted reinforcement allows more elongation because of the inherent ability of the fibers to move and rearrange themselves. Spiral wound hose has straight lines of rigid fiber which restrict elongation thereby enhancing the tendency of that hose to kink.

Extreme kinking occurs when a new coiled garden hose is first used. One end is fastened to the faucet and the user walks with the other end away from the faucet without allowing the coiled hose to untwist. Kinking also occurs due to the routine movements of the user. Rising prices and the scarcity of petrochemical raw materials has made the manufacture of thick walled hose uneconomical. Consequently, hoses are being made with thinner walls, resulting in an increased tendency to kink. When a thin wall modern hose does kink, water flow is shut off and the user must attempt to unkink it through manual manipulation such as swinging the hose to relax the kink or to walk back to the kink and manually straighten it. Some kinks require the user to walk all the way back to the faucet, shut off the flow thereby releasing the pressure, and unkink the hose. The user is further inconvenienced because he or she must walk back, turn on the water and then proceed to the far end to spray. An even more cumbersome problem arises when the user has already attached a large sprinkler device, such as an oscillating sprinkler to the end, and is forced to untwist the hose with this device attached.

A number of patents were cited during the prosecution of the above mentioned related application, namely, U.S. Pat. Nos. 2,562,116; 2,623,837; 2,825,588; 3,508,587; 3,696,773; 3,720,235; 4,131,399; 4,257,422; 4,410,012; 4,523,613 and 4,579,555. None of these patents disclose or suggest this invention and its advantages in overcoming the problems associated with the prior art hoses.

SUMMARY OF THE INVENTION

This invention is directed to a kink resistance flexible plastic or rubber hose for spraying water having opposite ends for delivery of pressurized water therethrough. The hose has an inside wall surface and an outside wall surface, the inside wall surface having integrally molded therewith a plurality of radially spaced ribs. The ribs extend substantially continuously longitudinally between the open ends and are adapted to provide a plurality of functions including resistance to hose kinking, water delivery through the hose when kinked and equalization of liquid pressure on both sides of the kink causing the hose to unkink. One end of the hose is adapted for coupling to a pressurized water supply for delivery of water under pressure through the hose. The other hose end is adapted for coupling to a flow restricting device for spraying a pressurized stream of water such as a spray nozzle. The spraying device provides sufficient back pressure in the hose for equalization of water pressure on both sides of the kink to cause the hose to unkink for delivery of the pressurized water therethrough.

Therefore, this invention satisfies a continuing need that heretofore has existed for a kink impeding hose for spraying water for many household and other purposes. As developed more fully hereinafter, this invention is predicated in part upon the discovery of an internally ribbed hose having a snap-back or self-straightening feature when it is kinked and connected to a spraying device. A flow restricting device such as a spray nozzle provides sufficient back pressure in the kinked hose such that the flow of water and pressure equalization on both sides of the kinked section actually straightens out the hose. Therefore, when the internally ribbed hose is being used and water delivered, it is capable with sufficient back pressure and equalization of water pressure on both sides of the kink to cause it to snap open during water delivery.

It has been found that with certain types of hose internal diameter (ID) dimensions and rib constructions, a standard spraying nozzle will automatically provide sufficient back pressure to unkink the hose during water spraying with an open nozzle. As more specifically defined hereinafter, a ⅝" ID hose with seven ribs will function in this fashion. In other hose sizes and ribbed constructions, depending upon the flow restriction, it may be necessary to momentarily restrict or shut off flow for the back pressure to increase and the hose to unkink itself. This is demonstrated specifically hereinafter by a ½" ID hose with 7 ribs. In any case, according to this invention, the internal rib construction of the flexible hose is adapted for coupling to a pressurized water spraying device for sufficient back pressure to unkink the hose. This self-unkinking or kink impeding feature is critical to the hose according to the principles of this invention.

A user of the hose is able to eliminate kinks and control water flow simply at the spray nozzle by controlling flow restriction to provide enough back pressure to unkink the hose. For instance, if one is hand watering by walking along and a kink is developed, the kink is likely to snap open even with the partial back pressure. But, if you momentarily close the spray nozzle, the kink will snap open at once. The user does not have to physically unkink the hose and experience this inconvenient or cumbersome task. Once the kink is removed by sufficient back pressure, full water flow is resumed by the kink impeding hose.

Thus, this invention is predicated in part upon the discovery of a kink impeding hose for spraying water. When the hose is kinked, the ribs allow a substantial amount of water to flow, enough to create internal pressure even when an open end nozzle is coupled to the hose. Surprisingly, the small flexible plastic or rubber ribs enable enough water to accelerate through the internal channels of the kink. The internal pressure on both sides of the kink tends to round out the hose and straighten the kink. Preferably the hose is coupled to a standard spray nozzle or sprinkler through an end coupling. However, the flow restricting spray device can be integrally formed or otherwise coupled to the hose.

In other features of this invention, the hose is especially adapted for use in homes where water pressures range from about 25 to about 120 psi, as is especially the case, where the hose is adapted for use as a garden hose. In a preferred form, the hose has a wall thickness between about 0.04 inch and about 0.15 inch, and inside diameter between about 0.5 inch and 3 inches excluding rib height, each of the ribs having a height between about 0.05 and about 0.10 inch and a rib base width between about 0.04 and about 0.125 inch. Most preferably, the hose has an inside diameter of about 0.5 to about 1 inch for household purposes. The rib and diameter dimensions of the hose are selected to provide the plurality of functions. More preferably, the ribs are equidistant from one another and extend continuously from one end of the hose to the other. However, it will be understood that it is essential for the ribs to extend substantially continuously to provide a plurality of functions including resistance to hose kinking, liquid delivery when kinked and equalization of pressure for unkinking the hose. The exact configuration of the ribs may vary. For instance, when used as a garden hose with ribs extending continuously from one end of the hose to the other, the hose has preferably an odd number of ribs between about 5 to about 11, usually 7, and the hose has an inside diameter of between about 0.5 to about 0.75 or 1 inch excluding rib height. The ribs may have a generally triangular shape or a trapezoidal shape, or other shapes, that may be molded with conventional extrusion equipment. When so molded, the configurations tend to be somewhat rounded at the tips because of the extrusion flow characteristics. The hose is made of plastic, natural rubber, synthetic rubber or thermoplastic rubber. In the case of soft vinyl plastic, the range of durometers may vary, depending upon the scale. According to the Shore A hardness scale ("Duro A"), the soft vinyl plastic may range from about 60 to about 90. Of course, on the Shore D scale, such hardnesses would range from about 16 to about 39. Duro A is referred to in the art of water hoses as that measurement for soft vinyl plastic, for instance, that provides the desired flexibility to function as a useful hose, i.e., for handling, winding and storage.

It will also be understood, in view of the detailed description herein, that the size and spacing of the ribs has to be related to the thickness and flexibility of the connecting wall so that the hose has enough water flow and is kink impeding. The purpose of a garden or water delivery hose is to deliver the maximum amount of water in the shortest time possible. Hence, the internal ribs must take up minimum volume and yet be large enough to be effective. The ribs can occupy up to about 10% of the internal volume of the hose, preferably about 3 to 5%, for reasons of cost, weight, flexibility and maximum water flow.

The rubber or plastic compositions enable the hose having a tubular inner core to be integrally molded with ribs. In a more preferred form, the hose is reinforced with filaments integrally molded with and surrounding the core, and an outer layer surrounding the reinforcement. This structure is achieved by running a reinforcing filament coated inner core having internal ribs through a heating tunnel which brings the core surface almost to the melting point, and then extruding the melted coating over it, penetrating the filaments, to weld the outer layer and core together with the filaments trapped in-between.

The hoses are adapted to be coupled and coupling can be achieved in a number of different ways. Standard metal annular couplings can be used. Plastic couplings can be insert-molded onto the hose, if desired. As developed hereinafter, it has been found that a coupling having an annular corrugation can be compressed into the hose wall where the corrugation is transverse to the longitudinal ribs to provide surface areas of greater and lesser compression for absorbing the ribs into the hose wall and thereby sealing the hose end against pressurized water leakage. The ribs in this construction have a size, number and hardness that are limited to what the hose wall thickness and softness can absorb for sealing against leakage. In a preferred form, a first annular corrugated ferrule on the outside wall surface of the hose is provided with a second corrugated ferrule on the inside wall surface of the hose for sealing said hose end therebetween to prevent the leakage.

DETAILED DESCRIPTION OF THE INVENTION

It is an object of the present invention to provide a hose having a plurality of longitudinally extending internal ribs for spraying water under pressure with a device to provide back pressure that enables the hose to be kink impeding. The invention also provides a ready means of swift and effective attachment of the connector couplings to the ends of such hose during manufacture in spite of the presence of the internal ribs.

Conventional water hoses have smooth inner walls. In contrast, hoses made according to the present invention have internal longitudinal ribs. The internal ribs add wall thickness to portions of an inside wall of the hose to reduce kinking. Kinking or compression can stop flow in a conventional hose. For example, if a hose connected to the water supply is running without a sprinkler at the other end, there is little pressure in the hose. If one steps on such a conventional hose it will flatten, thereby stopping the flow. The ribs of the present hose will prevent total occlusion of the hose at the site of kinking or compression without substantial loss in overall flow. Importantly, the hose can still be used to spray a stream of water under pressure.

One advantage of the present invention is that an unexpectedly large volume of water passes through the hose when the hose is kinked due to the acceleration of water through the kinked section. Another advantage of the present invention is that the kink tends to more readily snap open when pressurized by the termination of flow at the distal end, i.e., by closing an outflow nozzle. Another advantage of the present invention is the near total resistance of the ribbed thin walled hose to kinking while pressurized.

Hoses have connectors at each end for attaching the hose to a pressurized water supply and to flow restricting spray device (sprinkler, nozzle, etc.) which propels a stream of water under pressure. The connectors also serve to link one hose end to another hose end. It was completely unexpected that the connectors could be attached to the ends of the hose over ribbed hose portions without leaking. This unexpected result is very beneficial because it results in the future advantage that not only can a kink resistant hose be easily made with connector couplings, but also that the ribs can be continuous from one end of the hose to the other, and need not be adapted.

DESCRIPTION OF THE PREFERRED EMBODIMENTS

Figure 1:
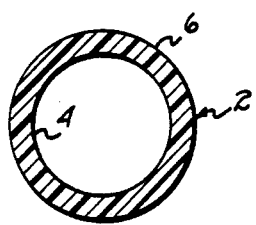
FIG. 1 discloses a cross-sectional view of a smooth walled hose to the prior art perpendicular to the hose longitudinal axis.
Figure 2A:
FIG. 2A discloses a second view of the hose of FIG. 1.
Figure 2B:
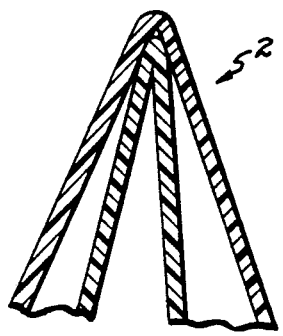
FIG. 2B discloses a schematic view of the hose of FIG. 2A.

Referring to FIG. 1, a conventional smooth bore hose 2 has an outside wall 6 and an inside wall 4. Flow can be stopped by kinking or compressing the hose 2. Typical compressing occurs when someone steps on the hose 2 or it is run over by a car (golf cart, tractor) or piece of gardening equipment. FIG. 2A shows a cross-sectional view of the conventional hose 2 when it is kinked. FIG. 2B shows a schematic view of the kinked hose 2. As FIGS. 2A and 2B show, the flowpath for fluid through the hose is blocked by the kink.

Figure 3:
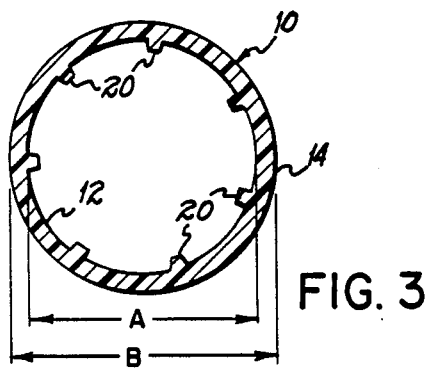
FIG. 3 discloses a cross-sectional view of a first embodiment of the hose of the present invention perpendicular to the hose longitudinal axis.
Figure 4A:
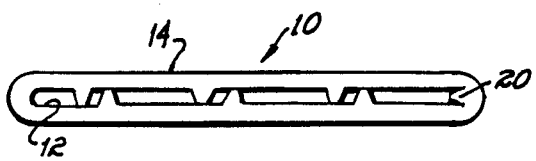
FIG. 4A discloses a second view of the hose of FIG. 3.
Figure 4B:
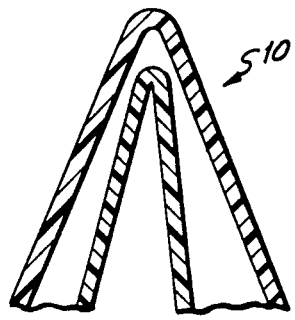
FIG. 4B discloses a schematic view of the hose of FIG. 4A.

FIG. 3 shows a hose 10 made according to the present invention. Hose 10 has an outside wall 14 and an inside wall 12 and includes a plurality of longitudinally displaced ribs 20 either attached to or extruded as part of the hose 10. Hose 10 has an inside diameter A ranging from 0.5 inch to 3.0 inches, preferably ranging from 0.5 inch to 0.75 inch. Hose 10 has an outside diameter B which ranges from 0.6 inch to 3.5 inches, preferably from 0.6 inch to 1.25 inches. FIGS. 4A and 4B depict hose 10 when kinked. FIG. 4A shows ribs 20 contacting the opposing inside wall 12. FIG. 4B is a schematic which omits showing the ribs 20 to simplify the Figure. Preferably the ribs 20 are continuous along the length of the hose 10 because when hoses are made by extrusion, the ribs are formed as part of the interior wall.

Because the purpose of the ribs is to prevent the internal walls from touching each other, thereby providing channels for water flow, their size is important, but so is their number. The size of the ribs is restricted by the subsequent crimping procedure used to attach a connecting coupler 52 (FIGS. 9 and 10) to an end of the hose 10. Thus, one must be cognizant of their number. For a typical 0.625 inch (inner diameter) hose, which has a flat internal slit 0.981 inch wide when compressed or kinked, 5 to 11 ribs are preferred and 7 ribs are the most preferred number if they are of the below-described size. An even number will crimp symmetrically, and the ribs will then fold so that they fall next to each other. An odd number will produce a random effect.

Figure 5:
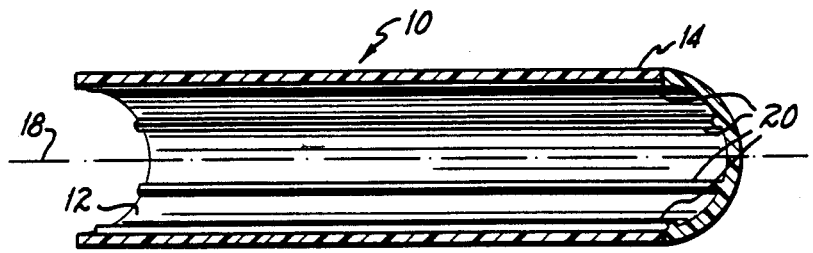
FIG. 5 discloses a longitudinal cross-sectional view of the hose of FIG. 3.

FIG. 5 shows a cross-sectional view of hose 10 having the ribs 20 viewed along a longitudinal axis 18 of the hose 10.

Figure 6:
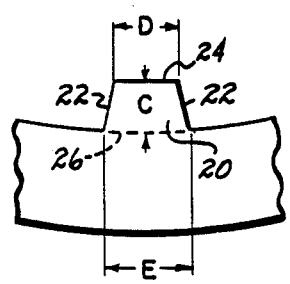
FIG. 6 discloses an enlarged view of a portion of FIG. 4.

FIG. 6 shows rib 20 having a trapezoidal shape formed by top wall 24, base 26 and side wall 22. Rib 20 has a base width E ranging from 0.04 inch to 0.125 inch, a top wall width D ranging from 0.0 inch (as when a trapezoid becomes a triangle as depicted in FIG. 8) to 0.125 inch, and a rib height C ranging from 0.05 inch to 0.10 inch.

Figure 7:
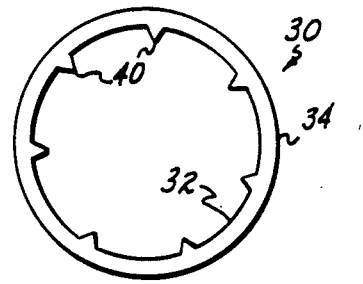
FIG. 7 discloses a cross-sectional view of a second embodiment of the hose of the present invention perpendicular to the hose longitudinal axis.

FIG. 7 shows a second embodiment of the present invention which differs from the first embodiment depicted in FIGS. 3-6 in that the longitudinal ribs have a triangular cross-section. FIG. 7 shows a hose 30 having an outside wall 34, an inside wall 32 and longitudinally displaced ribs 40 having a triangular cross-section. Other cross-sectional shapes such as a rounded shape or square shape could be employed.

Figure 8:
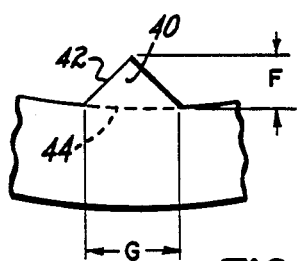
FIG. 8 discloses an enlarged view of a portion of FIG. 7.

FIG. 8 shows rib 40 formed by a base 44 and sidewalls 42. Rib 40 has a base width G ranging from 0.04 to 0.125 inch and a rib height F ranging from 0.05 to 0.10 inch.

Figure 9:
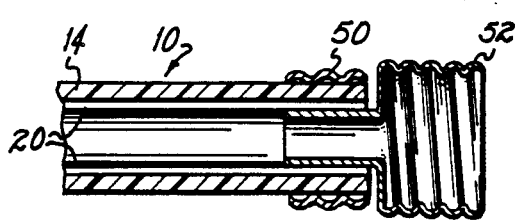
FIG. 9 discloses a cross-section view of the present invention with a connecting coupling prior to crimping.
Figure 12:
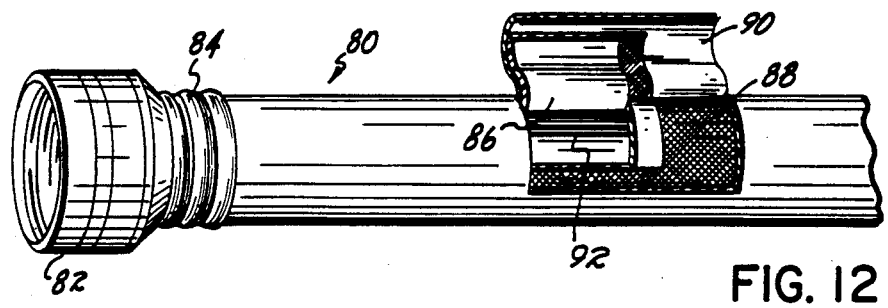
FIG. 12 discloses a fourth embodiment of the present invention.

FIG. 9 shows hose 10 with an external ferrule 50 and a standard male connector 52 inserted into the hose 10 having ribs 20. Other ribs are not shown for simplicity. Hoses typically have an inlet end and an outlet end. The inlet end is provided with a female connector such as a connector 82 (FIG. 12). The outlet end is provided with the male connector 52.

Figure 10:
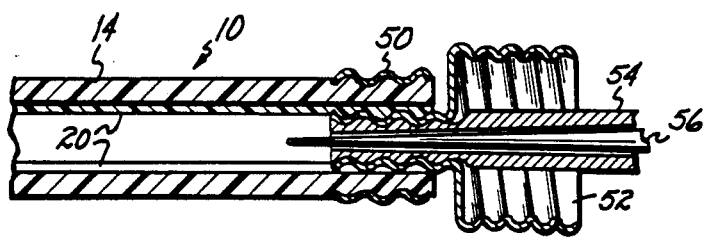
FIG. 10 discloses the apparatus of attaching the connecting coupling to the hose end.

FIG. 10 depicts the crimping procedure used to securely fasten connecting couplings to hose 10. A hardened steel collet 54 is inserted in connector 52, a tapered shaft 56 is driven forward deforming some portion of male connector 52 inside hose 10 in a corrugated pattern and creating a leak proof seal by wedging hose 10 between deformed connector 52 and opposingly corrugated ferrule 50. The crimping is done in a corrugated fashion, i.e., there are areas of greater and lesser compression, thus, allowing a better seal of hose material. FIG. 10 also shows that rib 20 is squeezed into the main body of the hose where opposing corrugations exert maximum force. (Other ribs are now shown for simplicity.) Therefore, a tight seal is obtained. A female connector 84 (of FIG. 12) is attached in the same way as the male connector 52.

Figure 11:
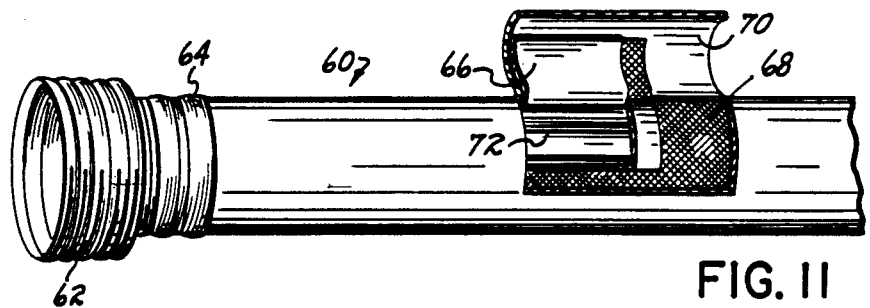
FIG. 11 discloses a third embodiment of the present invention.

FIG. 11 discloses a hose 60 having a male connector coupling 62 and a corrugated ferrule 64, hose 60 has an inner layer (core) 66, spiral wrapped filaments (filament reinforcement) 68 and an outer layer (cover) 70, with longitudinally displaced ribs 72 along the inside.

FIG. 12 discloses a hose 80 having a female connector coupling 82 and a corrugated ferrule 84, hose 80 has inner layer (core) 86, knitted filaments (filament reinforcement) 88 and an outer layer (cover) 90, with longitudinally displaced ribs 92 along the inside.

In a typical 3-ply hose 60, 80 (core 66, 86, filament reinforcement 68, 88, cover 70, 90 are shown by FIGS. 11 and 12, respectively) the ribs 72, 92 are triangularly shaped, between 0.050–0.060 inch high by 0.040–0.050 inch wide at the base. The total material thickness (all three layers excluding ribs) is at least 0.060 inch thick and the material stiffness does not exceed 90 durometer. Under these circumstances, there is enough soft material backing for the ribs to be squeezed away during crimping.

In addition to the hoses shown in FIGS. 11 and 12, other hoses can have (inner walls) of up to three plys (thin solid inner wall, foamed center, thin outer skin). Outer covers (outer wall) may have the same type of 3-ply constructions.

Figure 13:
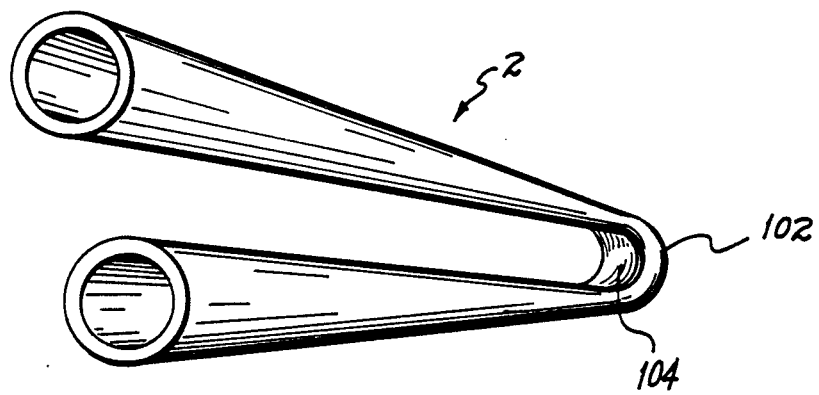
FIG. 13 discloses a perspective view of the hose of FIG. 2B.

FIG. 13 illustrates a kinked prior art hose 2 having a surface 102 outside the kink and a surface 104 forming the inside of the kink.

Figure 14:
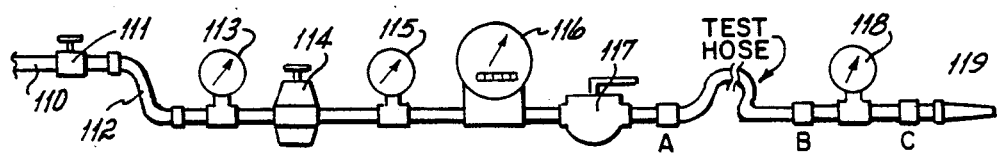
FIG. 14 is a diagrammatic view of a hose testing device to illustrate the features of this invention.

FIG. 14 is a diagrammatic view of a hose testing device that was built to test hoses of this invention and to study various parameters. Conventional hoses have also been tested for comparison with the kink impeding hoses. With reference to FIG. 14, the test device has an incoming line 110 from a pressure water supply through faucet 111. The connecting hose 112 is at least $\frac{5}{8}$ inch inside diameter, but no longer than 6 feet. The connecting hose 112 supplies full water flow from the faucet 111 with maintenance of line pressure by pressure regulator 114. The incoming line 110 is at least $\frac{3}{4}$ inch inside diameter and provides a steady supply maintaining pressure at gage (1) 113 exceeding 80 psi, even when full flow was allowed through the measuring rig with the pressure regulator 114 set for 50 psi at gage (2) 115, no hose was attached at A and the ball valve 117 was wide open. Many homes cannot deliver such water pressure conditions, but, for test purposes, allowance is made with an adjustable pressure regulator 114. Test hoses differing in diameter, length and configuration were attached between A and B in the device of FIG. 14. Between B and C, a short pressure measuring length containing gage (3) 118 is provided. This gage (3) 118 allowed measurement of pressure at the end of the test hose, either with end C wide open or with a nozzle 119 attached that discharges a pressurized water stream at point D. There are other ball valves in the system to make the operation easier, but they are not considered significant to the schematic illustration. Water flow was measured in gallons by means of the meter 116. A reading was taken at the meter 116 before the ball valve 117 was opened and then, after 5 minutes of flow, a second reading was then taken. The overall consumption was divided by 5 to get gallons per minute (gpm).

The nozzle 119 was a conventional hand held trigger spray nozzle having a retractable inner pin that was locked in the full open position by a screw locking device. The spray orifice, after full retraction of the pin, is about 0.234 inch and all tests were performed with that orifice.

A series of Examples 1–14 and Controls 1–2 using the test device of FIG. 14 were performed. Hoses of this invention were tested under different conditions for comparison with conventional hoses. The hose types tested are described in Table I and the results of the tests are described in Table II.

TABLE I

| Hose Type | $\frac{5}{8}$ Regular | $\frac{5}{8}$ Even Flow | $\frac{1}{2}$ Regular | $\frac{1}{2}$ Even Flow |
| --- | --- | --- | --- | --- |
| ID | .625 | .625 | .500 | .500 |
| Core | .045 | .075 | .048 | .053 |
| Material | Vinyl | Vinyl | Vinyl | Vinyl |
| Duro A | 85 | 82 | 80 | 80 |
| Rib Height | — | .068 | — | .058 |
| Width | — | .068 | — | .044 |
| Reinforcing Filament | knitted nylon (stitches 6.5/in.) | wrapped nylon (6/in.) | knitted nylon (stitches 9/in.) | wrapped nylon (4.5/in.) |
| Type | 66 | 66 | 66 | 66 |
| Total Denier | 840 | 840 | 840 | 840 |

TABLE I-continued

| Hose Type | ⅝ Regular | ⅝ Even Flow | ½ Regular | ½ Even Flow |
|---|---|---|---|---|
| Filaments | 140 | 140 | 140 | 140 |
| Cover | .034 | .048 | .034 | .040 |
| Material | Vinyl | Vinyl | Vinyl | Vinyl |
| Duro A | 80 | 80 | 80 | 80 |
| Foamed | — | 20% | — | — |
| OD | .783 | .871 | .664 | .686 |
| Inside area (sq. in.) | .307 | .286 | .196 | .184 |
| Length (ft.) | 50 | 50 | 50 | 50 |

With reference to Table I, under the heading "Hose Type", four hoses are detailed under the designations "⅝ Regular", "⅝ Even Flow", "½ Regular" and "½ Even Flow". "⅝ Regular" and "½ Regular" mean conventional ⅝" or ½", respectively, smooth inner wall hose of 3-ply construction. "⅝ Even Flow" and "½ Even Flow" mean ⅝" or ½", respectively, kink impeding hose, each having seven internal ribs evenly spaced on the inside core wall. The Even Flow hose construction is of the 3-ply type shown in FIGS. 11-12 with a rib similar to that shown in FIG. 8 except that the tip of the triangle was rounded because, as indicated above, the flow characteristics of the plastic under extrusion conditions leads to a rounded or somewhat parabolic configuration of the cross-section of the rib. Therefore, with reference to FIGS. 8 and 11-12, the ⅝" and ½" Even Flow hose construction of Table I can be understood. The core, reinforcing filament and cover are shown by numerals 66, 68 and 70 in the typical 3-ply hose of FIG. 11 with the ribs 72 rounded or dome shaped thereby closely approximating the shape of FIG. 8. The rib height and width of Table I approximate the dimensions F and G of FIG. 8. The "ID" of Table I is the inside diameter of the hose with reference to the measurement designated "A" of FIG. 3; and "OD" is the outside diameter with reference to the measurement taken as represented by "B" of FIG. 3. Relative thicknesses (inch) of the core 66 and cover 70, hose inside area (sq. in.) and hose length (feet) are given in Table I.

The "vinyl" employed as the plastic material of construction for the hoses of Table I is that generally used in the fabrication of water hoses of the garden hose type. The durometer (Shore A) or "Duro A" measurement is also specifically shown. In general, Shore A will range between about 60 and 90 for such soft vinyl plastics as described above. Over this range of durometer for soft vinyl, the elongation at break is from about 250 to about 450%; tensile ranges from about 1000 to about 3000 psi and modulus at 100% elongation ranges from about 500 to about 2000 psi. Also, for vinyl of this type, the densities normally range from about 1.15 (unfilled) to about 1.7 (highly filled) "Foamed" means 20% weight reduction due to closed cells containing a gas/foaming agent. Garden hoses and similar water delivery hoses are flexible or soft vinyl, vinyl/rubber or thermoplastic rubber materials. In such soft or flexible materials, the "Duro A" measurement is the measure understood to those of ordinary skill in the art as indicative of desired flexibility. Thus, "flexibility" or "flexible" as those terms are used hrein are intended to convey this meaning.

TABLE II

| Test Series | Hose Type | Condition | Back psi Gage 2 | End psi Gage 3 | gpm |
|---|---|---|---|---|---|
| Control 1 | | Direct from faucet, no test hose | 0 | — | 12.2 |
| Control 2 | | Direct from faucet to nozzle, no test hose | 40 | — | 6.6 |
| Example 1 | ⅝" Regular | Open end | 32 | — | 12.0 |
| Example 2 | ⅝" Regular | With nozzle | 44 | — | 6.4 |
| Example 3 | ⅝" Regular | Kinked & nozzle or no nozzle | 50 | 0 | 0 |
| Example 4 | ⅝" Even Flow | Open end | 30 | 4 | 11.7 |
| Example 5 | ⅝" Even Flow | With nozzle | 42 | 36 | 6.1 |
| Example 6 | ⅝" Even Flow | Kinked & no nozzle | 43 | 1 | 4.1 |
| Example 7 | ⅝" Even Flow | Kinked & nozzle | 44 | 14 | 3.8 |
| Example 8 | ½" Regular | Open end | 40 | — | 11.0 |
| Example 9 | ½" Regular | With nozzle | (44) | (32) | (5.6) |
| Example 10 | ½" Regular | Kinked & nozzle or no nozzle | 50 | 0 | 0 |
| Example 11 | ½" Even Flow | Open end | 40 | 4 | 8.1 |
| Example 12 | ½" Even Flow | With nozzle | 43 | 29 | 5.1 |
| Example 13 | ½" Even Flow | Kinked & no nozzle | 47 | 0 | 2.0 |
| Example 14 | ½" Even Flow | Kinked & nozzle | 46 | 4 | 2.0 |

With reference to Table II, Controls 1 and 2 were run for comparison with the hoses of Table I under different conditions. Except for Controls 1-2 where no hoses were used, the hose length of each Example 1-14 was 50 feet. Static pressure was regulated at 50 psi at gage 2 for Controls 1-2, and all Examples 1-14. In all Examples, the condition "open end" means the test hose was secured between A and B of the test device but no nozzle was used and the flow (gpm), back pressure (gage 2) and end pressure (gage 3) were determined. "With nozzle" or "nozzle" means the test was run with the nozzle 119 secured on the end of the device in the above described open position to provide a pressurized stream of water. "Kinked" means the hose was doubled back onto itself so that the walls touch each other, then tied within 2" of the kink, to hold the plastic in permanently kinked form. Obviously in this form the kink cannot snap open. Thus, "kinked & no nozzle" or "kinked & nozzle" means the hose was tested with the kink, and with or without the nozzle.

Now, using the FIG. 14 device, Control 1 was employed without hose where the back pressure of gage 2 was 0 and 12.2 gpm was delivered to show what the system was capable of delivering. For Control 2, no hose was employed and the nozzle was used in a fully open position as described above with the delivery of 6.6 gpm.

The first series of Examples 1-3 were with the $\frac{5}{8}''$ Regular hose as the test hose with an open end (Example 1), with the nozzle (Example 2) and the kinked with or without nozzle (Example 3). With reference to the results of Examples 1-3, a $\frac{5}{8}''$ Regular hose delivered 12 gpm when open ended and, when a strong stream of water was produced by the nozzle, the flow delivery was reduced to 6.4 gpm. However, when the hose was kinked, with or without nozzle, the end psi at gage 3 was reduced to 0 and, of course, the flow stopped as indicated by 0 gpm.

For comparison with the $\frac{5}{8}''$ Regular hose of Examples 1-3, Examples 4-7 were conducted with $\frac{5}{8}''$ Even Flow hose construction illustrated by the drawings and described in Table I. When this hose was tested with the open end, nozzle, kinked (no nozzle) and kinked (nozzle), Examples 4-7, respectively, a number of observations were made. First, the internal rib construction of this invention does not significantly reduce the flow through the $\frac{5}{8}''$ hose by comparing the 12 gpm of Example 1 with 11.7 gpm of Example 4. A similar comparison may be made with the nozzle as used with the Regular hose of Example 2 and the ribbed hose of Example 5 indicating that the gpms delivered are nearly the same, i.e., 6.4 in comparison to 6.1. It should also be understood that experimental errors and variation in diameter also account for some differences. With the spray nozzle attached to the Even Flow hose, it should be observed that the back pressure (gage 2) and end pressure (gage 3) increased significantly to 42 and 36, respectively (Example 5). When Even Flow hose was fully kinked with no nozzle, it still delivered 4.1 gpm. Further, when the hose was fully kinked and the nozzle employed, 3.8 gpm were delivered increasing the pressure at gage 3 to 14 indicating the back pressure of the spray device. Thus, with the Even Flow hoses of this invention, the kinks still allow about 3.8 gpm to pass. Furthermore, if the kinks had not been tied, the back pressure of 14 psi would have snapped the hose open, thereby returning the flow to about 6 gpm. In fact, in experiments where such kinks were not tied, the nozzle creating the back pressure was sufficient to snap the hose open and remove the kink.

Examples 1-7 thus demonstrate that the Even Flow hose of this invention achieves the advantages developed above in the Summary and Description of this invention and satisfies a need for a kink impeding hose that has existed for many years. The ribbed hose is adapted for coupling to a pressurized water supply on one end and the other end is adapted for coupling to a flow restricting device for spraying a pressurized stream of water such as the spray nozzle 119. The spraying device provides sufficient back pressure of the hose for equalization of water pressure on both sides of the kink to permit the water to continue to flow through the hose even in the fully kinked position as demonstrated by Examples 5-6. Furthermore, if the kink were not tied and permanent as is the case in these examples, the nozzle would provide sufficient back pressure for the hose to snap back.

The principles of this invention may also be demonstrated with a $\frac{1}{2}''$ Even Flow hose in comparison to a $\frac{1}{2}''$ Regular hose with reference to Examples 8-14 of Table II. In the case of Examples 8-10 for the $\frac{1}{2}''$ Regular hose, the tests were repeated with open end, nozzle, kinked & nozzle and kinked & no nozzle. The results of Table II for the $\frac{1}{2}''$ Regular hose closely follow the results for a $\frac{5}{8}''$ Regular hose except that the flow in gpm is reduced to 11 gpm for the $\frac{1}{2}''$ hose. It is noted in this connection that the results for the $\frac{1}{2}''$ Regular hose with nozzle are in parenthesis which indicates that these numbers were obtained by extrapolation, but do represent actual results based upon comparative tests. In this connection, it is also noted, with a nozzle that the flow is also reduced below that for the $\frac{5}{8}''$ Regular hose as expected. With the kink, however, and with or without the nozzle, there is no flow through the Regular hose and the line pressure is equivalent to the back pressure as measured by gage 2 at 50 psi. With reference to Examples 11-14, employing the $\frac{1}{2}''$ Even Flow hose of this invention, the flow in the open end condition is 8.1 gpm which is lower than the 11 gpm for the Regular hose. The nozzle with the Even Flow hose provides 5.1 gpm and a back pressure of 43 and 29, respectively, at gages 2 and 3. With the kink, and with or without the nozzle, 2 gpm are still delivered through the hose. Accordingly, even with the $\frac{1}{2}''$ Even Flow hose and in the permanently kinked condition, $\frac{1}{2}''$ hose behaves like the $\frac{5}{8}''$ hose in its ability to continue to deliver water through the kink even though at a lower rate. Testing of $\frac{1}{2}''$ Even Flow hoses without the permanent kink demonstrated that either the snap back condition is achieved with the fully opened spray nozzle or momentary shut off permits the back pressure to snap back the hose. The spray device may also be slightly closed so that the back pressure increases to snap open the hose.

As developed above, a key aspect of the invention is that the flow through a narrowed passage may actually straighten the hose if a nozzle or other device provides sufficient back pressure to the kinked section. For example, during watering use of a conventional hose the exit end is open and there is reduced pressure in the hose. When the hose is kinked and fully shut off, full pressure develops up to the kink but never beyond. The hose of the present invention, in contrast, permits flow through a kinked hose so there is pressure on both sides of the kink. Thus, under full pressure, as when the nozzle, etc. at the hose discharge end is turned off, the hose is fully blown and forced round.

The hose unkinks due to the development of high pressure on each side of the partial occlusion. Water is usually supplied to a home at pressures ranging from about 25-50 to 120 pounds per square inch (psi). When the existing flow in a 0.625 inch (inner diameter) hose is stopped, for example by a closed spray nozzle, an equal force distributed over 2 inches on both sides of the kink, assuming a pressure of 70 psi, will be on the order of 275 pounds. This force will "round out" the hose forcing it to snap open. Assuming a 50 psi pressure, the force will be about 196 pounds. In contrast, a smooth wall prior art hose will not develop equal pressure on each side of the ink. Thus, water cannot flow past the kink and back pressure down stream from the kink does not develop.

In addition, a hose with such ribs that has been pressurized (i.e., has an open faucet and a closed nozzle), is nearly, it not totally, impossible to kink. In contrast, a presurized hose lacking such ribs can still kink. Finally, an unexpected advantage of the invention is the absence of leakage at the end fittings (coupling connectors). Under proper circumstances the presence of the interior ribs can be made as to not interfere with sealing of the fittings. Thus, the hose can have connectors attached to the ends of the hose with or without adapting the hose ends to remove the ribs at the hose ends. The present inventor achieved this very surprising result after trying components and crimping conditions while, frankly, believing it would never work. The inventor was prepared to ream out the ribs at the ends of the hose so that standard industry parts and practices could be used. The hose wall typically is 0.100 inch thick; addition of the ribs adds 0.05 to 0.100 inch. Therefore, standard ferrules could not be used. Preferably the ferrules have the following dimensions: the overall thickness of the ferrule is 0.02 inch; for use in a 0.625 inch inner diameter hose the ferrule placed inside the hose has an outer diameter of 0.625 inch; the annular ferrule placed on the outside of the hose end has a diameter of 0.825 inch. When attaching the couplers, the wall hardness of the still warm hose must be within the range 50 to 75 measured by the durometer. The crimping machine must be adapted to expand the ferrule much more than normal and to squash away the rib. The crimping machine must expand the inner ferrule with the hardened steel collet as depicted in FIG. 10.

The steel collet on insertion has a diameter of 0.535 inch. With the ribbed hose it must be expanded to at least 0.80 inch in order to create an effective seal. Preferably it is expanded to 0.80 inch. Using the crimping machine on a normal hose, it need only be expanded to 0.725 inch. Preferably this crimping procedure is carried out while the hose is warm and soft as when the hose has been extruded but not allowed to cool to room temperature during its manufacture. Typically, immediately after manufacture the hose is about 110° F. Alternately, a partially foamed wall will more readily absorb larger, and therefore even more effective, ribs during crimping. Users may want to repair damaged hoses by cutting off a defective part and attaching commercially available "hose members" which also compress themselves onto the hose wall. Some squash small ribs away, some do not under normal conditions. It is recommended that the user soften the hose in boiling water before attaching the mender. Furthermore, there are limits to what can be done. The size, number and hardness of the ribs must be limited to what the thickness and softness of the wall can absorb under crimping conditions described.

While specific embodiments of the present invention have been shown and described, it should be apparent that many modifications can be made thereto without departing from the spirit and scope of the invention. Accordingly, the invention is not limited by the foregoing description, but is only limited by the scope of the claimed appended hereto.

What is claimed is:

1. A kink resistant flexible plastic or rubber hose for spraying water having opposite open ends for the delivery of pressurized water therethrough comprising:

a hose having an inside wall surface and an outside wall surface, said inside wall surface having integrally molded therewith a plurality of radially spaced ribs, said ribs extending substantially continuously longitudinally between said open ends, said hose having sufficient flexibility to be double backed upon itself to form a kink, said plurality of ribs extend only a short distance from the inside wall surface so that said ribs touch the opposing inside wall surface areas between opposing ribs when said kink is formed, said ribs adapted to provide a plurality of functions including resistance to hose kinking, water delivery through said kink and equalization of water pressure on both sides of said kink causing the hose to unkink and straighten itself;

one said hose and for coupling to a pressurized water supply for delivery of water under pressure through said hose and the other hose end for coupling to a flow restricting device for spraying a pressurized stream of water that provides sufficient back pressure in said hose for said equalization of water pressure on both sides of the kink to cause said hose to unkink and straighten itself for said delivery of water therethrough.

2. The hose of claim 1, for use with water at pressures supplied to a home ranging from about 25 to about 120 psi.

3. The hose of claim 1, for use as a garden or other water delivery hose.

4. The hose of claim 1, wherein said hose has a wall thickness between about 0.04 inch and about 0.15 inch, an inside diameter between about 0.5 inch and 3 inches excluding rib height, each of said ribs have a height between about 0.05 and about 0.10 inch and a rib base width between about 0.04 and about 0.125 inch, said rib and diameter dimensions selected to provide said plurality of functions.

5. The hose of claim 4, where said ribs are equidistant from one another.

6. The hose of claim 1, wherein said ribs extend continuously from one end of said hose to the other.

7. The hose of claim 1, for use as a garden hose wherein said ribs extend continuously from one end of said hose to the other, said hose has an odd number of ribs between about 5 to about 11, and said hose has an inside diameter of between about 0.5 inch and about 0.75 inch excluding rib height.

8. The hose of claim 7, wherein said ribs have a generally triangular shape.

9. The hose of claim 7, wherein said ribs have a generally trapezoidal shape.

10. The hose of claim 7, said hose being of soft vinyl plastic with a range of durometer readings from about 60 to about 90.

11. The hose of claim 7, said hose being of natural rubber, synthetic rubber or thermoplastic rubber.

12. The hose of claim 1, wherein said hose wall comprises a tubular inner core having said integrally molded ribs, a filament reinforcement surrounding said core and an outer layer surrounding said reinforcement and welded to said core around said reinforcement.

13. The hose of claim 12, wherein said hose has about 7 ribs.

14. The hose of claim 1, said hose being of soft vinyl plastic, natural rubber, synthetic rubber or thermoplastic rubber having a wall thickness between about 0.04 inch and about 0.135 inch excluding rib dimensions, said hose having an inside diameter of between about 0.5 inch and about 1 inch excluding rib height, said hose having from about 5 to about 9 ribs.

15. The hose of claim 1 wherein a spray nozzle is coupled to one end of said hose to provide sufficient back pressure to cause unkinking during delivery of pressurized water therethrough.

16. The hose of claim 1 wherein said ribs occupy up to about 10% of the internal volume of the hose.

17. The hose of claim 16 wherein said ribs occupy about 3 to about 5% of said internal volume.

18. A kink resistant flexible plastic or rubber household water hose for spraying water having opposite open ends for the delivery of pressurized water therethrough comprising:
   a hose having an inside wall surface and an outside wall surface, said inside wall surface having integrally molded therewith a plurality of radially spaced ribs, said ribs extending substantially continuously longitudinally between said open ends, said hose having sufficient flexibility to be double backed upon itself to form a kink, said plurality of ribs extend only a short distance from the inside wall surface so that said ribs touch the opposing inside wall surface areas between opposing ribs when said kink is formed, said ribs adapted to provide a plurality of functions including resistance to hose kinking, water delivery through said kink and equalization of water pressure on both sides of said kink causing the hose to unkink and straighten itself,
   one said hose end for coupling to a pressurized water supply for delivery of water under pressure through said hose and the other hose end for coupling to a spray nozzle for spraying a pressurized stream of water that provides sufficient back pressure in said hose for said equalization of water pressure on both sides of the kink to cause said hose to unkink and straighten itself for said delivery of water therethrough.

19. The hose of claim 18 wherein said ribs occupy up to about 10% of the internal volume of the hose.

20. The hose of claim 19 wherein said ribs occupy up to about 3 to about 5% of said internal volume.

* * * * *